Aug. 27, 1946.     C. B. SCHNEIBLE     2,406,441
SEPARATING APPARATUS
Filed April 13, 1942
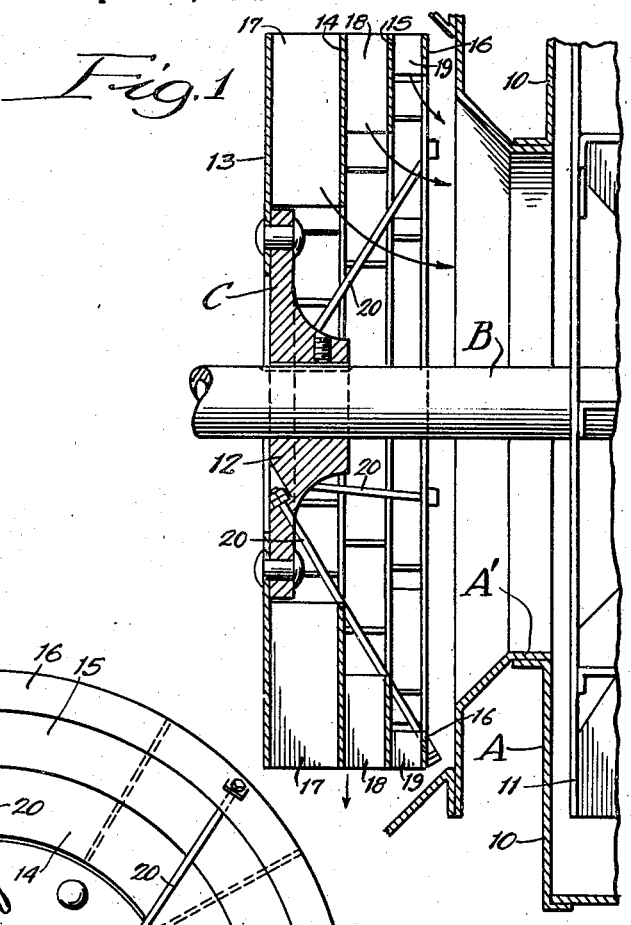
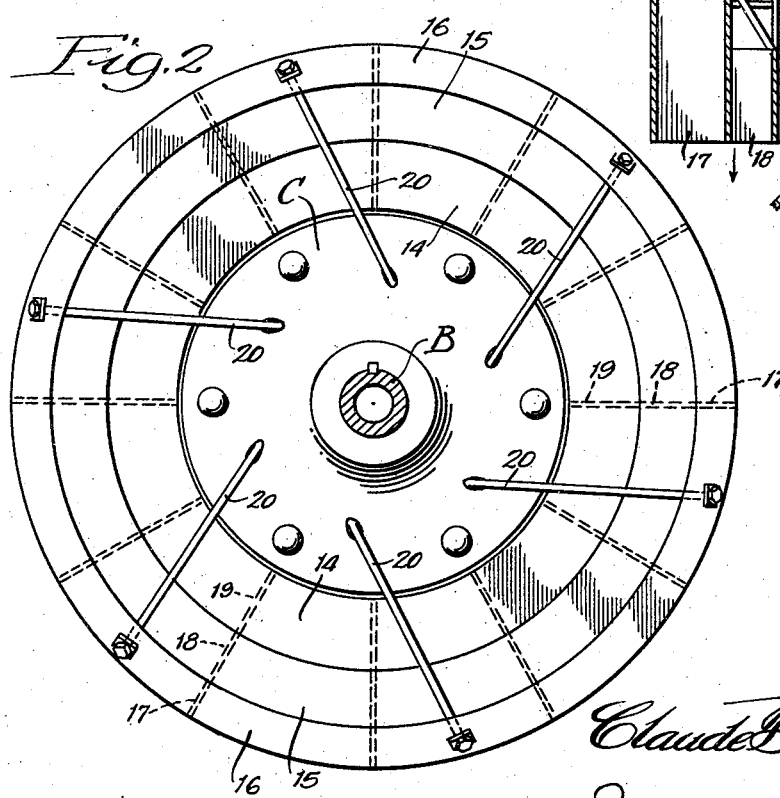

Patented Aug. 27, 1946

2,406,441

UNITED STATES PATENT OFFICE 2,406,441

SEPARATING APPARATUS

Claude B. Schneible, Detroit, Mich.

Application April 13, 1942, Serial No. 438,741

2 Claims. (Cl. 183—77)

This invention relates to separating apparatus. It is particularly useful in the separating of foreign or solid particles carried in a gaseous medium. The apparatus may be used for eliminating solid particles carried in heated gases from blast furnaces, cupolas, cement furnaces, and particle-laden air from many other structures. Other specific uses will be obvious.

An object of the invention is to provide apparatus which will effectively eliminate solid or foreign particles carried in a medium, the medium being withdrawn free of such particles. A further object is to provide apparatus in which a separator element is provided with improved means whereby foreign or solid particles will be rejected and freed from a withdrawn stream of medium. Other specific objects and advantages will appear as the specification proceeds.

The invention is illustrated, in a preferred embodiment, by the accompanying drawing, in which—

Figure 1 is a transverse sectional view of apparatus embodying my invention; and Fig. 2, a rear view of the refuser wheel or separator fan.

In the illustration given, A designates a casing providing an outlet A'; B, a driven shaft; and C, a filter fan.

The casing A may be of any suitable construction. It may, if desired, provide a chamber about the fan C into which particle-laden gas is drawn. It may also provide a fan casing 10 in which a suction fan 11 or other suitable means for creating a suction is secured. The fan C is positioned so as to guard the opening A' and is mounted on the shaft B by which it is rotated.

The filter fan C, constituting my invention herein, comprises a hub portion 12, to the outer end of which is secured a shroud plate 13. Spaced inwardly from the plate 13 are annular plates 14, 15 and 16. The plate 14 has an inside diameter less than that of plate 15, and plate 15 has an inside diameter less than that of plate 16. Between plates 13 and 14 are a plurality of spaced vanes 17. Between plates 14 and 15 are vanes 18 which are shorter and narrower than vanes 17. Between plates 15 and 16 are vanes 19 which are shorter and narrower in width than vanes 18.

It will be noted that with the structure shown, the interior of the filter fan is hollow, the opening therein tapering rearwardly toward the outlet A', thus providing an outlet which enlarges as it nears the outlet A'. The vanes 17, 18 and 19 extending between the plates 13, 14, 15 and 16 provide a series of radial cells spaced longitudinally of the fan. The cells provided by vanes 17 with their associated plates are longer and wider than the cells provided by vanes 18 and their associated plates, while the cells provided by vanes 19 with their associated plates are still smaller than the cells described.

Brace rods 20 are secured, as shown, to the hub portion 12 and to the outer plate 16, as shown best in Fig. 1.

Operation

In the operation of the apparatus, the gaseous medium containing particles is drawn by means of the fan 11, or any other source of suction, toward inlet A'. The rotation of the filter fan C rejects the solid particles suspended in the gas stream at the point of entrance thereto and allows only the medium freed of the particles to pass through the outlet A'.

The filter fan C is extremely efficient in this operation by reason of the longitudinally-disposed cells formed by vanes extending between the annular plates. Since the air must pass through the rectangular passageways provided in the filter fan by the arrangement of annular plates and vanes, a variable drop in pressure would be sustained in the different rectangular passages if they were all of the same width, as a result of the difference in their length. This difference in pressure drop, due to the different lengths of the rectangular openings, is overcome by increasing the openings in width in proportion to their length, as shown more clearly in Fig. 1.

While in the foregoing description, I have set forth certain details of structure for the purpose of illustrating the invention, it will be understood that all of the details are not essential and that the same may be eliminated or substitutions employed therefor without departing from the spirit of my invention.

I claim:

1. In apparatus in which a casing is provided with an outlet opening and a rotatably-mounted shaft extends in front of said opening, a centrifugal separator wheel carried by said shaft and having a central opening communicating with said outlet opening, said wheel comprising a hub carried by said shaft, an end plate closing the inner end of said wheel, annular plates spaced from each other and said end plate, vanes between said plates forming longitudinally-spaced cells of varying cross section and through which the medium must pass to reach the central opening of said wheel, said longitudinally-spaced cells being shorter and narrower toward said outlet opening.

2. In apparatus in which a casing is provided with an outlet opening and a rotatably-mounted shaft extends in front of said opening, a centrifugal separator wheel carried by said shaft and having a central opening communicating with said outlet opening, said wheel comprising an end plate closing the inner end of said wheel, a plurality of annular plates spaced from each other and said end plate, the spacing between said plates being progressively less toward said opening, said annular plates being of different inner diameters, causing the opening in said wheel to be progressively larger as it approaches said outlet opening, and vanes between said plates and forming with said plates longitudinally spaced cells which are shorter and narrower toward said outlet opening.

CLAUDE B. SCHNEIBLE.